Figure 3:
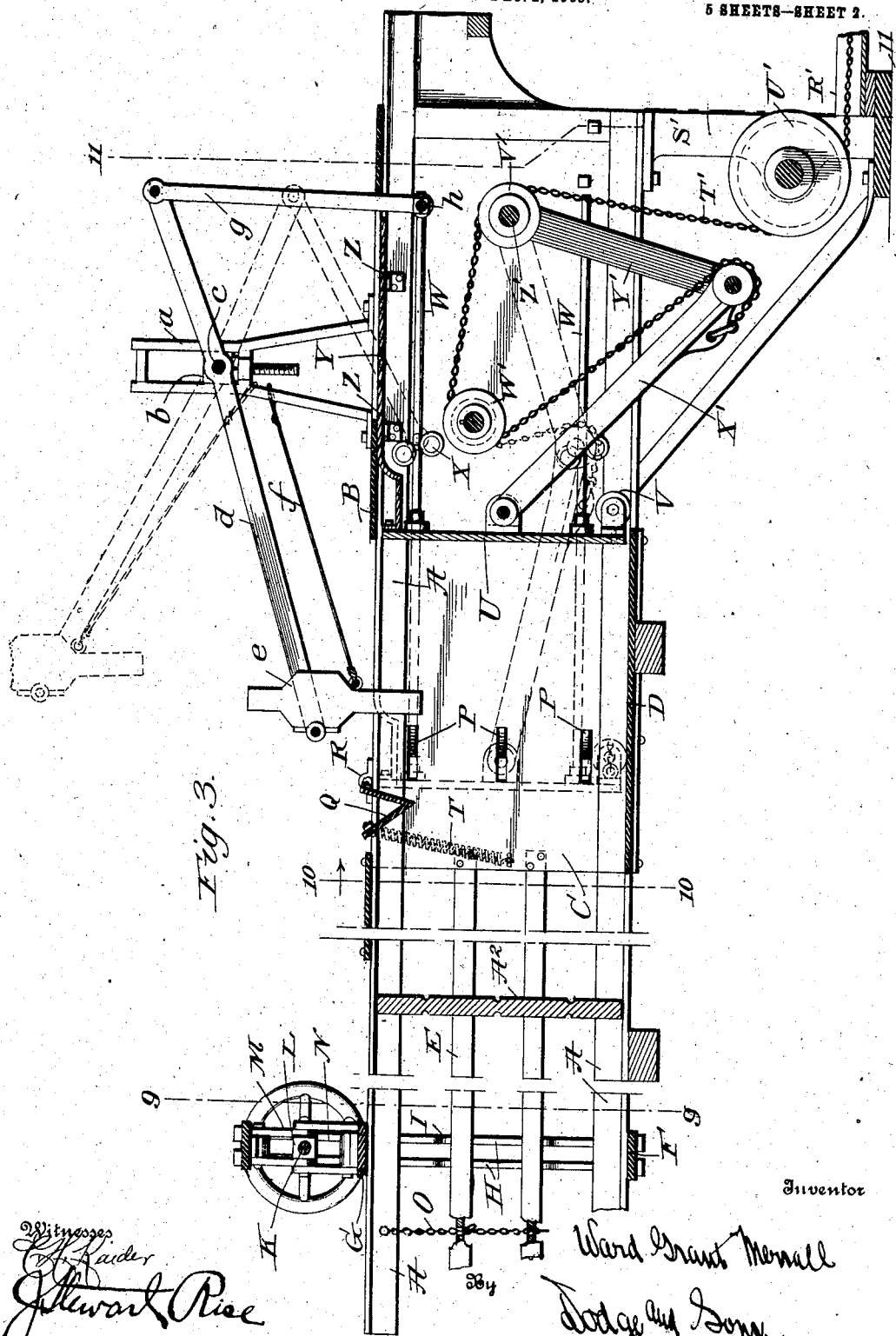

No. 839,170. PATENTED DEC. 25, 1906.
W. G. MERRALL.
BALING PRESS.
APPLICATION FILED DEC. 1, 1905.
5 SHEETS—SHEET 1.
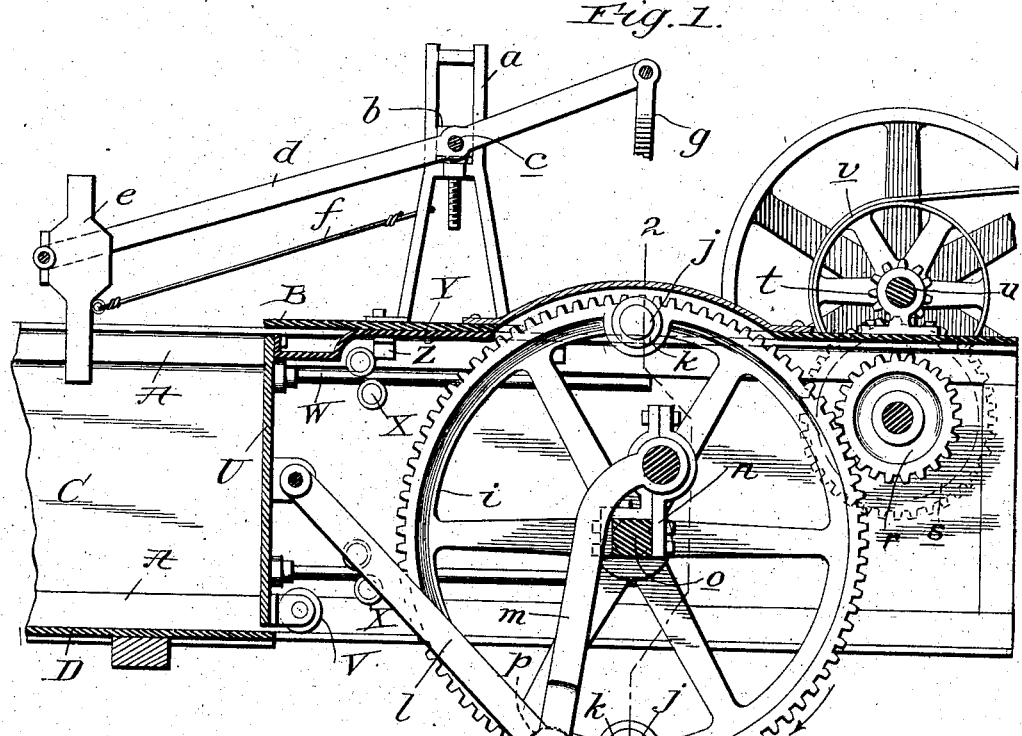
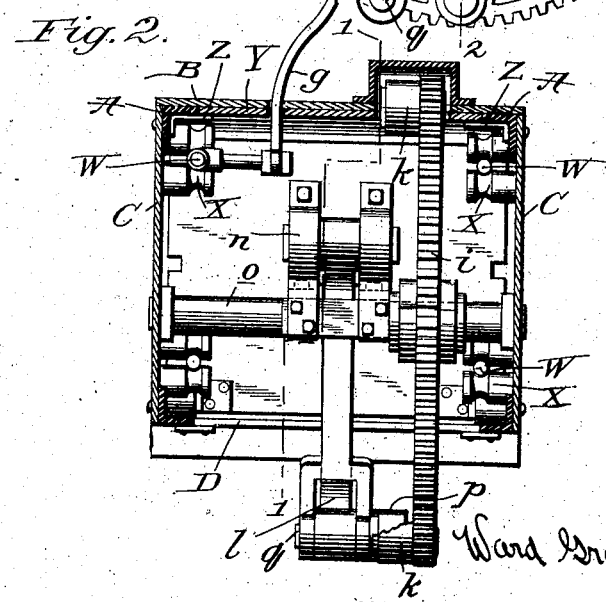

No. 839,170. PATENTED DEC. 25, 1906.
W. G. MERRALL.
BALING PRESS.
APPLICATION FILED DEC. 1, 1905.

5 SHEETS—SHEET 2.

Witnesses Inventor
Ward Grant Merrall
By Dodge and Sons,
Attorneys

No. 839,170. PATENTED DEC. 25, 1906.
W. G. MERRALL.
BALING PRESS.
APPLICATION FILED DEC. 1, 1905.
5 SHEETS—SHEET 3.
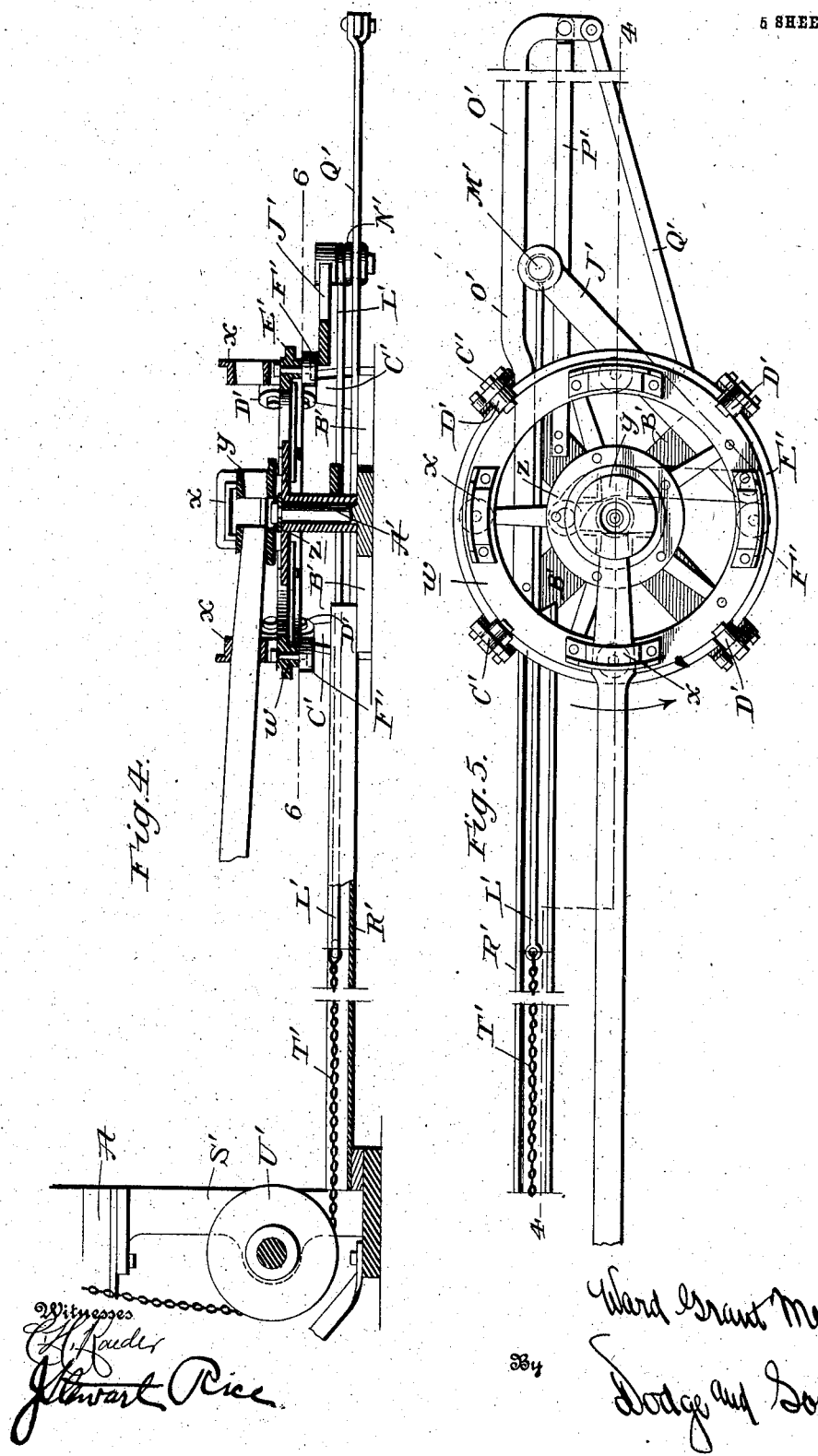

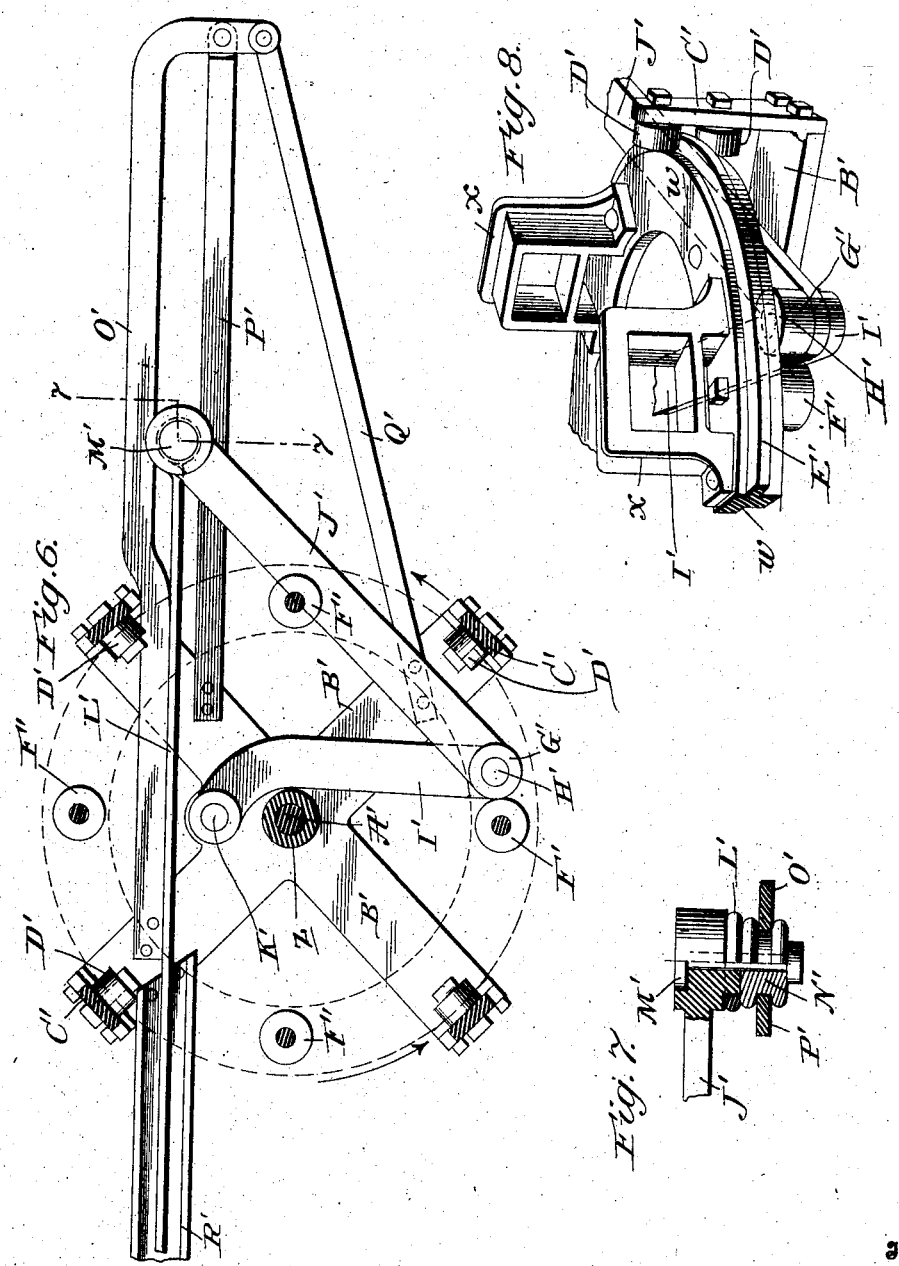

No. 839,170. PATENTED DEC. 25, 1906.
W. G. MERRALL.
BALING PRESS.
APPLICATION FILED DEC. 1, 1905.
5 SHEETS—SHEET 5.
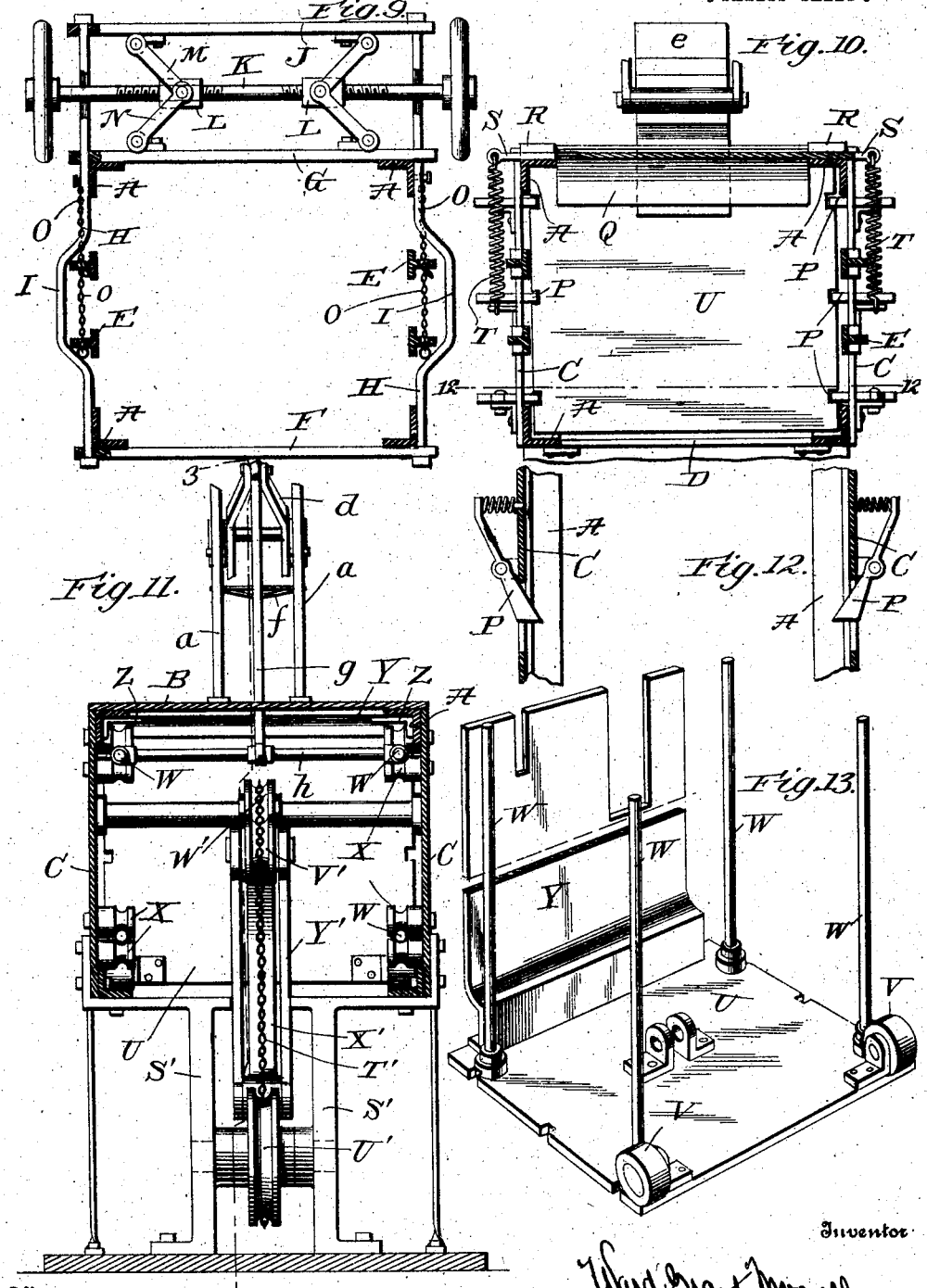

UNITED STATES PATENT OFFICE.

WARD GRANT MERRALL, OF ONONDAGA, ONTARIO, CANADA.

BALING-PRESS.

No. 839,170.  Specification of Letters Patent.  Patented Dec. 25, 1906.

Application filed December 1, 1905. Serial No. 289,830.

*To all whom it may concern:*

Be it known that I, WARD GRANT MERRALL, a subject of the King of Great Britain, residing at Onondaga, in the county of Brant, Province of Ontario, Dominion of Canada, have invented certain new and useful Improvements in Baling-Presses, of which the following is a specification.

My present invention pertains to improvements in baling-presses, the construction and advantages of which will be hereinafter set forth.

The object of the invention is to provide a simple and efficient press, the mechanism being such that in one form the press may be readily transported and operated by an engine or the like, and in the second form it may be operated by horse-power, the essential features being employed in both constructions.

Referring to the drawings, Figure 1 is a vertical longitudinal sectional view of the rear portion of the press, taken on the line 1 1 of Fig. 2; Fig. 2, a transverse vertical sectional view taken on the line 2 2 of Fig. 1; Fig. 3, a longitudinal sectional view showing the press and a portion of a modified form of operative mechanism therefor; Fig. 4, a side elevation of the remainder of the operative mechanism designed to work in conjunction with that shown in Fig. 3; Fig. 5, a top plan view of the actuating wheel or member and the connections shown in Fig. 4; Fig. 6, a horizontal sectional view taken on the line 6 6 of Fig. 4, the parts being shown on a somewhat-enlarged scale; Fig. 7, a vertical sectional view taken on the line 7 7 of Fig. 6; Fig. 8, a perspective view of a portion of the operating member or wheel as used in the modified construction; Fig. 9, a vertical sectional view taken on the line 9 9 of Fig. 3; Fig. 10, a similar view taken on the line 10 10 of Fig. 3; Fig. 11, a like view taken on the line 11 11 of Fig. 3; Fig. 12, a horizontal sectional view taken on the line 12 12 of Fig. 10, and Fig. 13 a perspective view of the plunger and the attached parts.

The main body of the press is the same under both constructions, and certain other features are the same, the only difference between the two constructions being that the operating wheel or member which actuates the plunger is in one instance mounted directly in the rear portion of the press-body, while in the modification it is located at a point remote from the press and actuates the plunger through intermediate connections.

The body of the press is formed of four L-shaped angle plates or bars A, to which are secured the top plate B, the sides C, and at the mid-length of the press or at that portion which forms the compression-chamber a bottom D. (See Figs. 3 and 10.) The angle-bars extend forwardly beyond the compression-chamber and with the intermediately-disposed T-shaped bars E, which are secured at their inner ends to the side plates C, form a chamber for the reception of the compressed bale. A cross-bar F (see Fig. 9) extends beneath the lowermost pair of angle-plates A, while a second cross bar or member G lies upon the upper face of the uppermost pair of angle-bars A. Tie-rods H pass through the outer ends of the lower bar F and through the outer ends of the upper bar G, the rods being deflected or provided with outwardly-curved sections I to permit them to pass the intermediate bars or members E. The upper ends of the rods pass through a third cross-bar J, the upper and lower ends of the rods being headed or provided with nuts to keep the bars F and J in position.

A toggle mechanism is interposed between the upper pair of bars—to wit, G and J—and in the form shown comprises a shaft K, provided with right and left screw-threads that coact with threaded blocks L, which as they are moved in one or the other direction serve to shorten or lengthen the toggles formed by the members M and N, which, as noted upon reference to Fig. 9, are pivotally connected to the blocks and to the cross-bars G and J. By actuating the toggles the angle-bars A may be brought closer together, and the height of the chamber into and through which the compressed bales are forced is somewhat restricted. The intermediate bars E are supported at their outer ends by chains O, (see Figs. 3 and 9,) the chains preferably passing through the flanges of the bars E, (best indicated in Fig. 9,) though it is of course evident that they may be attached to the bars in any desired manner. Said bars are likewise prevented from being forced outwardly by the bale by the tie-rods H H, as will be seen upon reference to Fig. 9. It will also be seen by reference to said figure that the inner faces of the T-shaped bars E stand in alinement with the inner faces of the angle-bars A, and consequently a passage is formed through which the bale may be forced without tearing or breaking the outer layer thereof. The side walls of the box or compression-chamber are provided with a series of openings, through which work spring-actuated detents P, (see Figs. 3 and 12,) as is usual in presses of this character.

Located at the forward end of the opening through which the hay or other material to be baled is introduced I provide a tucker, designed to confine the loose ends of the hay as the same is forced thereunder through the action of the plunger. In the form shown the tucker comprises a V-shaped member Q, (see Figs. 3 and 10,) which extends from side to side of the press and projects downwardly into the compression-chamber. Said tucker is provided with outwardly-extending pintles, which are secured in bearings R, mounted upon the angle-bars A. Arms S extend outwardly from the opposite portion of the tucker, and springs T, connected to said arms and to studs projecting outwardly from the press-body, serve to hold the tucker in the position shown in Fig. 3, so that as the press-plunger is moved forward the tucker is raised and the springs are put under tension. Upon a return movement of the plunger the tucker will be swung downward or into the position shown in Fig. 3, thereby carrying the loose ends of the hay or other material being baled inwardly, forming a neat end upon the bale.

The plunger U (see Figs. 3 and 13) is of a size to work freely through the press and is provided at its lower side with a pair of rollers V, which rest upon the horizontal members of the lowermost pair of angle-bars A, which, in effect, form a track for said rollers. In order to properly position and guide the plunger, I provide four rods W, which extend rearwardly therefrom and pass through or between grooved guide-rollers X, (see Figs. 1, 3, and 11,) said rollers serving to embrace the rods, and thereby prevent the plunger from tilting or tipping out of its proper position.

To the upper rear side of the plunger is secured a guard or shield Y of a width sufficient to extend over and protect the parts which underlie it. Said guard or shield is sustained upon both sides by brackets Z, (see Figs. 3 and 11,) which are secured to the uppermost angle members A. In the form illustrated in Figs. 1 and 2 the shield or guard Y is slotted longitudinally to permit the passage therethrough of the various actuating parts, hereinafter referred to in detail.

Secured to the upper face of the press are two uprights or standards a, in which are mounted bearing-blocks b, supporting a cross-shaft c. Said shaft has secured to it a frame d, the forward end of which is pivotally attached to a packer e, said packer being relatively heavy. This packer is designed to force the hay or other material down into the opening formed in the upper portion of the press immediately in front of the plunger. To maintain the packer in its upright position, there is connected to it and to the standards a a wire or rod f, which, as will be seen upon reference to Fig. 3, maintains the packer in its vertical position at all times. To the rear end of the frame d is attached a link g, which in turn is pivotally connected to a cross-bar h, (see Fig. 11,) said bar in turn being pivotally connected to the guide-rods W. From this it will be seen that as the plunger is moved forward the rear end of the frame d will be depressed, and as a consequence the packer will be elevated to the position shown in dotted lines in Fig. 3. In other words, as the plunger is moved forwardly the packer is elevated preparatory to the rearward movement of the plunger and the introduction of a fresh charge of material to be compressed.

The actuating mechanism for the plunger may be said to comprise an actuating member or wheel carrying a series of studs or rollers which coact with a toggle and serve, through the straightening of said toggle, to force the plunger forwardly each time one of said rollers comes into contact with the toggle and moves out of alinement therewith. In the form shown in Figs. 1 and 2 the actuating wheel or member is mounted directly in the body of the press. With the preferred construction, or that illustrated in Figs. 1 and 2, the actuating member takes the form of a large gear-wheel i, provided with two studs j, carrying rollers k. Any number of these rollers may be employed. A toggle-lever, comprising the members or links l and m, is connected at its forward end to the plunger U and at its rear end to a bracket n, secured upon a fixed shaft o, which extends from side to side of the press. A roller p, Figs. 1 and 2, is secured to the pin or bolt q, which connects the adjacent ends of the links l and m.

With the parts in the positions shown in Figs. 1 and 2 and with the actuating member or gear i moving in the direction indicated by the arrow in Fig. 1 roller k will come into contact with the roller p and as a consequence will force the link m upwardly and tend to straighten the toggle, thereby forcing the plunger U forwardly into the compression-chamber. The rollers will remain in contact until the toggle is substantially straight, at which time the plunger will be at its limit of forward movement. A slight further rotation of the actuating member or gear i will carry the roller k out of contact with the roller p, thereby permitting the plunger to be drawn backwardly by the toggle-links l and m, which, by reason of their weight, will tend to assume the position shown in Fig. 1. The continued rotation of the actuating member will of course bring the second stud and its roller into alinement with the roller on the toggle, and the operation above set forth will be repeated.

Motion is imparted to the actuating member in any suitable manner—as, for instance, by a pinion $r$, a gear $s$, and a small pinion $t$, the latter meshing with the relatively large gear $s$ and receiving its motion through a shaft $u$, upon which is mounted a bandwheel $v$.

The construction thus far described may be termed a "self-contained press;" but it may be desirable to operate the machine by horse-power, in which event an actuating member of substantially the form shown in Figs. 6 and 8 would be employed and intermediate connections used between it and the plunger. Such a construction is shown in detail in Figs. 3, 4, 5, 6, 7, 8, and 11. Under this construction the actuating member $w$, instead of being driven through gearing, is provided with a series of yokes $x$, mounted upon the outer portion thereof, and a suitable socket member $y$, secured or formed at the inner portion thereof. The actuating member takes substantially the form of a wheel, and beneath the centrally-disposed socket member $y$ there is secured a hub $z$. This hub surrounds or is journaled upon a stud-axle $A'$, which extends upwardly from a suitable base formed by a series of radially-disposed arms $B'$. The outer end of each of said arms is provided with an upright or standard $C'$, each standard having attached to it a pair of horizontally-disposed rollers $D'$, which coact with a rib or flange $E'$, formed upon the periphery of the wheel or actuating member $w$. A series of rollers $F'$ is secured to the under face of said actuating member $w$, said rollers standing in alinement with a roller $G'$, (see Fig. 6,) carried by the connecting-pin $H'$ of the toggle-links $I'$ $J'$. The inner end of the toggle link or lever $I'$ is fulcrumed at $K'$ to the base, while the outer end of the link or lever $J'$ is connected to a rod $L'$. In order to properly position the outer end of the link $J'$ and prevent the roller $G'$ from being deflected out of the path of travel of the rollers $F'$, a pintle $M'$ is passed through the outer end of said link and through a grooved roller $N'$, which works between guide-bars $O'$ and $P'$, which are secured to each other and to the base. A suitable brace $Q'$ is connected to the outer end of the guide-bar $O'$, as will be seen upon reference to Fig. 6.

A trough-shaped member $R'$ is interposed between the brackets or legs $S'$ of the press and the base upon which the operative mechanism is mounted. The rod $L'$ and a chain $T'$, to which it is connected, lie within said trough-shaped member. The chain passes about an idler $U'$, secured upon a shaft carried by the legs $S'$. (See Figs. 3 and 11.) The chain also passes over an idler $V'$, a third idler $W'$, and thence about the rounded end of a link $X'$, to which it is secured, as shown in Fig. 3. The link $X'$, with the double link $Y'$, which latter is pivoted at $Z'$, forms a toggle-joint for the actuation of the plunger, the forward end of the link $X'$ being connected to the plunger of the press, as shown in Fig. 3.

As will be readily understood, rotation of the actuating member $w$ in the direction indicated by the arrow in Fig. 6 will cause the toggle formed by the links $I'$ and $J'$ to be straightened and as a consequence will throw the rod $L'$ rearwardly and with it the chain $T'$, which drawing upon the toggle formed by the links $X'$ $Y'$ will straighten said toggle and force the plunger forwardly into the position shown in dotted lines in Fig. 3. As the roller $F'$ rides off the roller $G'$ when the toggle $I'$ $J'$ is straightened the plunger will be retracted, being drawn rearwardly through the weight of the toggle $X'$ $Y'$, which assumes the position shown in Fig. 3. As a consequence the chain $T'$ will likewise be drawn toward the press and the toggle $I'$ $J'$ through its connection with the rod $L'$ will be broken or brought into the position shown in Fig. 6.

It will of course be understood that the usual abutment-boards will be employed in the formation of the bale. One of these boards is shown in section in Fig. 3 and is designated by $A^2$. The parts will be suitably grooved to facilitate the passage of the binding-wires about the compressed bale.

It is evident that the bales as they are completed will be forced out by the next succeeding bale and that the degree of pressure at which the bales are to be formed may be regulated by contracting the discharge end or mouth of the press in the manner hereinbefore set forth.

Having thus described my invention, what I claim is—

1. In a press, the combination of a series of L-shaped bars extending throughout the length thereof, a compression-chamber formed intermediate said bars; a second series of bars extending forwardly from said compression-chamber intermediate and independent of each pair of upper and lower L-shaped angle-bars; means connected to the upper L-shaped bars for sustaining the outer ends of said second series of bars; a cross-bar located beneath the lower pair of L-shaped angle-bars adjacent to the outer ends thereof; a second cross-bar resting upon the upper faces of the upper pair of L-shaped angle-bars; a third cross-bar; tie-rods connecting the third cross-bar and the lower bar; and a toggle mechanism acting upon said second and third bars and serving to force the same apart and thereby to contract the discharge end of the press, substantially as described.

2. In a press, the combination of a compression-chamber; L-shaped angle-bars extending forwardly therefrom at the angles thereof; a series of horizontally-disposed T-shaped bars extending forwardly from each side of the compression-chamber intermediate the L-shaped angle-bars; a cross-bar extending beneath the outer ends of the lowermost pair of L-shaped angle-bars; a second cross-bar resting upon the uppermost L-shaped angle-bars; a third cross-bar located at a point above the second cross-bar; tie-rods passing through said cross-bars, each of said rods being provided with a deflected portion passing outside of the intermediate T-shaped bars; and a toggle mechanism interposed between the upper cross-bar and the one immediately below it, whereby the L-shaped angle-bars may be drawn together, substantially as described.

3. In a press, the combination of four L-shaped angle-bars extending throughout the length thereof; plates secured to said angle-bars to form a compression-chamber; intermediate angle-bars extending outwardly from the compression-chamber; means to sustain said intermediate bars at their outer ends; means independent of said sustaining means for preventing outward deflection of said intermediate bars; toggle mechanism acting in conjunction with said L-shaped angle-bars to draw the same together to the desired degree; a plunger; a pair of rollers mounted adjacent to the lower edge of the plunger and resting upon the horizontally-disposed members of the lower pair of L-shaped angle-bars; and a shield secured to the upper rear face of the plunger and movable therewith.

4. In a press, the combination of a compression-chamber; a plunger working therein; a series of guide-rods secured to and extending rearwardly from said plunger; a series of grooved rollers secured to the framing of the press, each rod being embraced by a pair of such grooved rollers; and a shield secured to the upper rear face of the plunger and movable therewith.

5. In a press, the combination of a compression-chamber; a plunger mounted therein; an actuating member comprising a wheel-like structure; means for rotating said member; a series of studs extending outwardly from said member, adjacent to the periphery thereof; a toggle having its fixed pivot out of line with the axis of the actuating member, and its central pivot in the path of travel of the studs; and connections between the opposite end of the toggle and the plunger.

6. In a press, the combination of a suitable compression-chamber; a plunger working therein; an actuating member having substantially the form of a wheel; means for imparting motion to said member; a series of roller-studs extending from said member adjacent to its periphery; a toggle having a fixed pivot at one end, out of line with the axis of the actuating member, and connections intermediate its opposite end and the plunger; and a roller carried by the toggle at its intermediate pivotal point, said roller standing in alinement with the studs on the actuating member.

7. In a press, the combination of a compression-chamber; a plunger mounted therein; an actuating member comprising a wheel-like structure; means for imparting motion to said actuating member; a series of roller-studs projecting from said member adjacent to its periphery; means for guiding said actuating member and maintaining it in its proper position; a toggle having one fixed pivotal point; a roller carried by the toggle at the point of connection of the links thereof, said roller standing in alinement with the roller-studs carried by the actuating member; a rod pivotally connected to the opposite or free end of the toggle a second toggle connected to the plunger of the press and to a fixed shaft mounted in the press; and a chain connected to said last-named toggle and to the rod.

8. In a press, the combination of a compression-chamber; a plunger working therein; a toggle mechanism connected to and adapted to move the plunger; an actuating member comprising a wheel-like structure; a series of actuating studs carried thereby; a second toggle adapted to be moved by said studs; and connections intermediate the first and second toggles.

In testimony whereof I have signed my name to this specification in the presence of two subscribing witnesses.

WARD GRANT MERRALL.

Witnesses:
 LEO HARRIS,
 IRENE BAXTER.